(12) United States Patent
Moore et al.

(10) Patent No.: US 11,925,260 B1
(45) Date of Patent: Mar. 12, 2024

(54) THERMOSTAT HOUSING ASSEMBLY AND METHODS

(71) Applicant: Braeburn Systems LLC, Montgomery, IL (US)

(72) Inventors: Glenn Moore, Montgomery, IL (US); John Bingham, Plainfield, IL (US)

(73) Assignee: Braeburn Systems LLC, Montgomery, IL (US)

( * ) Notice: Subject to any disclaimer, the term of this patent is extended or adjusted under 35 U.S.C. 154(b) by 345 days.

(21) Appl. No.: 17/504,768

(22) Filed: Oct. 19, 2021

(51) Int. Cl.
*H02G 3/08* (2006.01)
*A47B 81/00* (2006.01)
*E05B 65/00* (2006.01)

(52) U.S. Cl.
CPC ............ *A47B 81/00* (2013.01); *E05B 65/006* (2013.01)

(58) Field of Classification Search
CPC .......... H02G 3/08; H02G 3/081; H02G 3/086; H02G 3/10; H02G 3/12; H02G 3/121; A47B 81/00; E05B 65/006; H05K 5/00; H05K 5/02; H05K 5/0004; H05K 5/0247; H05K 5/03; H05K 7/00
USPC ............. 174/50, 480, 481, 520; 220/3.2–3.9, 220/4.02; 248/906, 343; 361/600, 601, 361/679.02
See application file for complete search history.

(56) References Cited

U.S. PATENT DOCUMENTS

| | | |
|---|---|---|
| 2,054,039 A | 9/1936 | Persons |
| 2,060,636 A | 11/1936 | Persons |
| 2,253,418 A | 8/1941 | Marsh |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | Mcpherson |
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |

(Continued)

FOREIGN PATENT DOCUMENTS

| | | |
|---|---|---|
| GB | 2441221 | 2/2006 |
| JP | 58065977 | 4/1983 |

(Continued)

*Primary Examiner* — Angel R Estrada

(74) *Attorney, Agent, or Firm* — The Law Offices of Kornad Sherinian, LLC; Depeng Bi

(57) ABSTRACT

A control housing assembly is disclosed. The housing assembly includes a housing and an escutcheon that manually connects to the housing by the engagement of escutcheon latches with housing catch channels. When the escutcheon is connected to the housing, the housing covers the escutcheon latches so as to obstruct the latches from being manually accessed to disengage the latches from the catch channels. The housing includes tool access slots through which a tool can be inserted to disengage a latch from a catch channel.

7 Claims, 6 Drawing Sheets

(56) References Cited

U.S. PATENT DOCUMENTS

| | | |
|---|---|---|
| 4,420,794 A | 12/1983 | Anderson |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,289,362 A | 2/1994 | Liebl et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Penno |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,211,782 B1 | 4/2001 | Sandelman et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,569,777 B1 * | 8/2009 | Gillam ............... H01H 37/043 |
| | | 174/50 |
| 7,575,179 B2 | 8/2009 | Morrow et al. |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,732,715 B2 * | 6/2010 | Paolucci ............... H01R 24/76 |
| | | 174/53 |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,091,795 B1 | 1/2012 | McLellan |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |
| 9,304,676 B2 | 4/2016 | Poplawski |
| 9,989,273 B2 | 6/2018 | Read et al. |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers |
| 2004/0193324 A1 | 9/2004 | Hoog |
| 2004/0230402 A1 | 11/2004 | Jean |

(56) References Cited

U.S. PATENT DOCUMENTS

| | | |
|---|---|---|
| 2004/0245352 A1 | 12/2004 | Smith |
| 2004/0256472 A1 | 12/2004 | DeLuca |
| 2004/0260427 A1 | 12/2004 | Wimsatt |
| 2005/0027997 A1 | 2/2005 | Ueno et al. |
| 2005/0033707 A1 | 2/2005 | Ehlers et al. |
| 2005/0040248 A1 | 2/2005 | Wacker |
| 2005/0040249 A1 | 2/2005 | Wacker |
| 2005/0044906 A1 | 3/2005 | Spielman |
| 2005/0082836 A1 | 4/2005 | Lagerwey |
| 2005/0108620 A1 | 5/2005 | Allyn et al. |
| 2005/0119793 A1 | 6/2005 | Amundson et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Yoshida |
| 2006/0220386 A1 | 10/2006 | Wobben |
| 2007/0045429 A1 | 3/2007 | Chapman |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman, Jr. et al. |
| 2007/0278320 A1 | 12/2007 | Lunacek et al. |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0045263 A1 | 2/2009 | Mueller et al. |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1 | 3/2010 | Harrod et al. |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0261465 A1 | 10/2010 | Rhoads et al. |
| 2010/0318200 A1 | 12/2010 | Foslien |
| 2011/0004825 A1 | 1/2011 | Wallaert |
| 2011/0031806 A1 | 2/2011 | Altonen et al. |
| 2011/0046791 A1 | 2/2011 | Sakae |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0024685 A1 | 1/2013 | Kolavennu et al. |
| 2013/0032414 A1 | 2/2013 | Yilmaz |
| 2013/0090767 A1 | 4/2013 | Bruck et al. |
| 2013/0056989 A1 | 5/2013 | Sabhapathy |
| 2013/0123991 A1 | 5/2013 | Richmond |
| 2013/0211783 A1 | 8/2013 | Fisher et al. |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0081465 A1 | 3/2014 | Wang et al. |
| 2014/0098247 A1 | 4/2014 | Rao |
| 2014/0152631 A1 | 6/2014 | Moore et al. |
| 2014/0156087 A1 | 6/2014 | Amundson |
| 2014/0163746 A1 | 6/2014 | Drew |
| 2014/0254577 A1 | 9/2014 | Wright et al. |
| 2014/0316581 A1 | 10/2014 | Fadell et al. |
| 2014/0319233 A1 | 10/2014 | Novotny |
| 2015/0081568 A1 | 3/2015 | Land, III |
| 2015/0095843 A1 | 4/2015 | Greborio et al. |
| 2015/0100167 A1 | 4/2015 | Sloo et al. |
| 2015/0167995 A1 | 6/2015 | Fadell, et al. |
| 2015/0233595 A1 | 8/2015 | Fadell |
| 2015/0280935 A1 | 10/2015 | Poplawski et al. |
| 2016/0047569 A1 | 2/2016 | Fadell et al. |
| 2016/0062618 A1 | 3/2016 | Fagan |
| 2016/0123618 A1 | 5/2016 | Hester et al. |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2017/0102681 A1 | 4/2017 | Verhoeven et al. |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0364104 A1 | 12/2017 | Poplawski et al. |
| 2018/0005195 A1 | 1/2018 | Jacobson |
| 2018/0031266 A1 | 2/2018 | Atchison |

FOREIGN PATENT DOCUMENTS

| | | |
|---|---|---|
| JP | 2004218436 | 8/2004 |
| JP | 2006009596 | 1/2006 |
| KR | 20050034417 | 4/2005 |

\* cited by examiner

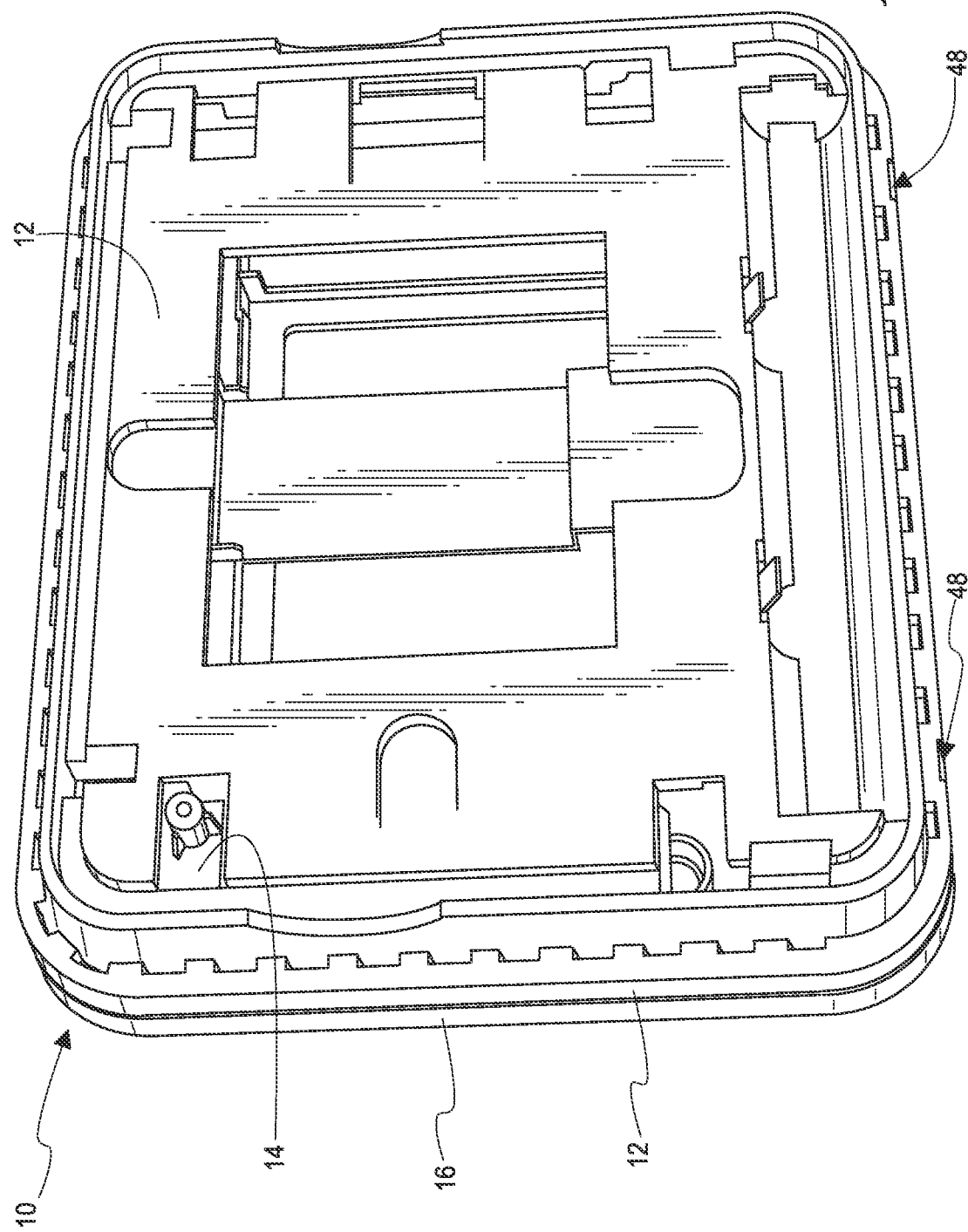

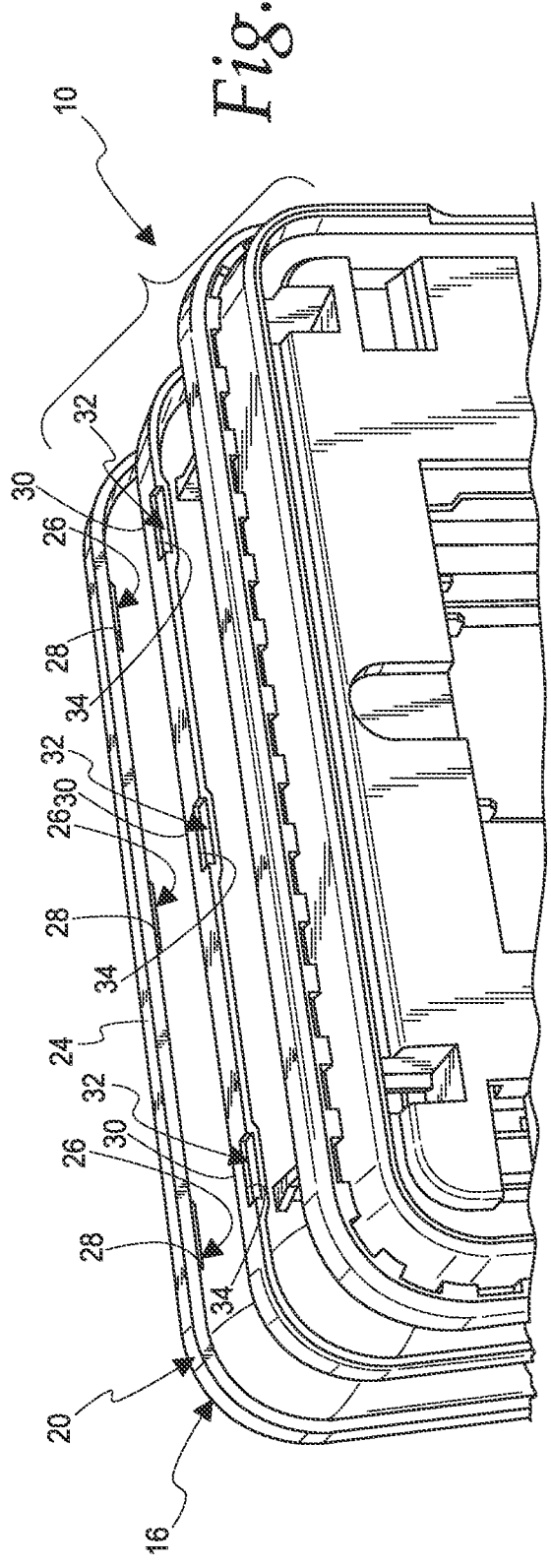

THERMOSTAT HOUSING ASSEMBLY AND METHODS

CROSS REFERENCE

None.

FIELD OF THE DISCLOSURE

The present disclosure relates to a housing assembly for a control system housing, and more particularly relates to the control system housing assembly and methods of assembling and disassembling the control system housing.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present disclosure, or any embodiments thereof, to anything stated or implied therein or inferred thereupon.

Some control systems housings, such as thermostats, heating systems control housings, ventilation systems control housings, air conditioners control housings, refrigeration control housings, humidifier and dehumidifier control housings, carbon control housings, drip and other irrigation controller housings, grow lamps and other sunlight control housings are widely used in residential and commercial buildings. Such housing assemblies can include a front cover panel (escutcheon) assembled to a housing member. In many instances, it is desirable for the escutcheon to be removable from the housing member, so as to permit access to the housing member or to an interior space that is covered by the escutcheon. However, it is desirable for the escutcheon to be difficult to remove, to prevent unwanted removal, such as may be inadvertent or by a child, for example. At the same time, it is desirable for the escutcheon to be easy to attach to the housing member, to reduce the time and effort of assembly for a technician or end user. Existing control system housing assemblies fall short of these objects, by the escutcheon being either easy to attach and easy to remove or difficult to attach and difficult to remove.

A need therefore exists for a control housing assembly having an escutcheon that is easy to attach to and difficult to remove from a housing member.

SUMMARY

According to an aspect of the disclosure, control panel housing assembly includes a housing and an escutcheon, the housing comprising at least one housing member. The at least one housing member comprises a first wall and a second wall generally opposite the first wall, the first wall comprising a first catch channel and the second wall comprising a second catch channel. The escutcheon is adapted to be connected to the at least one housing member. The escutcheon comprises a front panel and a peripheral skirt connected to the front panel, the peripheral skirt extending rearwardly from the front panel. The peripheral skirt comprises a first wall and a second wall generally opposite the first wall, the first wall comprising a first latch and the second wall comprising a second latch. The first latch is adapted and configured to engage the first catch channel when the escutcheon is aligned with and manually moved rearwardly into connection with the at least one housing member, so as to obstruct forward movement of the first escutcheon wall away from the at least one housing member when the escutcheon is connected to the front housing member. The second latch is adapted and configured to engage the second catch channel when the escutcheon is aligned with and manually moved rearwardly into connection with the at least one housing member, so as to obstruct forward movement of the second escutcheon wall away from the at least one housing member when the escutcheon is connected to the at least one housing member. The housing is adapted and configured so that, when the escutcheon is connected to the at least one housing member, the housing covers the first latch so as to obstruct manual access to first latch and covers the second latch so as to obstruct manual access to the second latch. The housing further comprises a tool access slot adapted and configured to permit a tool to be inserted through the tool access slot and to move the second latch to a disengaged position relative to the second catch channel so as to permit forward movement of the second escutcheon wall away from the at least one housing member.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2 is a rear-bottom-left perspective view of the housing assembly of FIG. 1.

FIG. 3 is a truncated rear-top-left exploded perspective view of the housing assembly of FIG. 1.

FIG. 4 is a truncated rear-bottom-left exploded perspective view of the housing assembly of FIG. 1.

FIG. 5 is an enlarged, truncated rear-bottom-left partially exploded perspective view of the housing assembly of FIG. 1.

A person of ordinary skill in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, unless otherwise clearly stated, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Control housings and methods of attaching and removing an escutcheon to and from a control housing member, according to embodiments of the disclosure, are now described. It will be appreciated that a control escutcheon according to an embodiment is easily manually assembled to a control housing member, difficult or practically impossible to remove manually or inadvertently from the control housing member, but requiring no special skill or extraordinary effort for a technician or even an ordinary consumer to remove using a proper tool.

Figure 1:
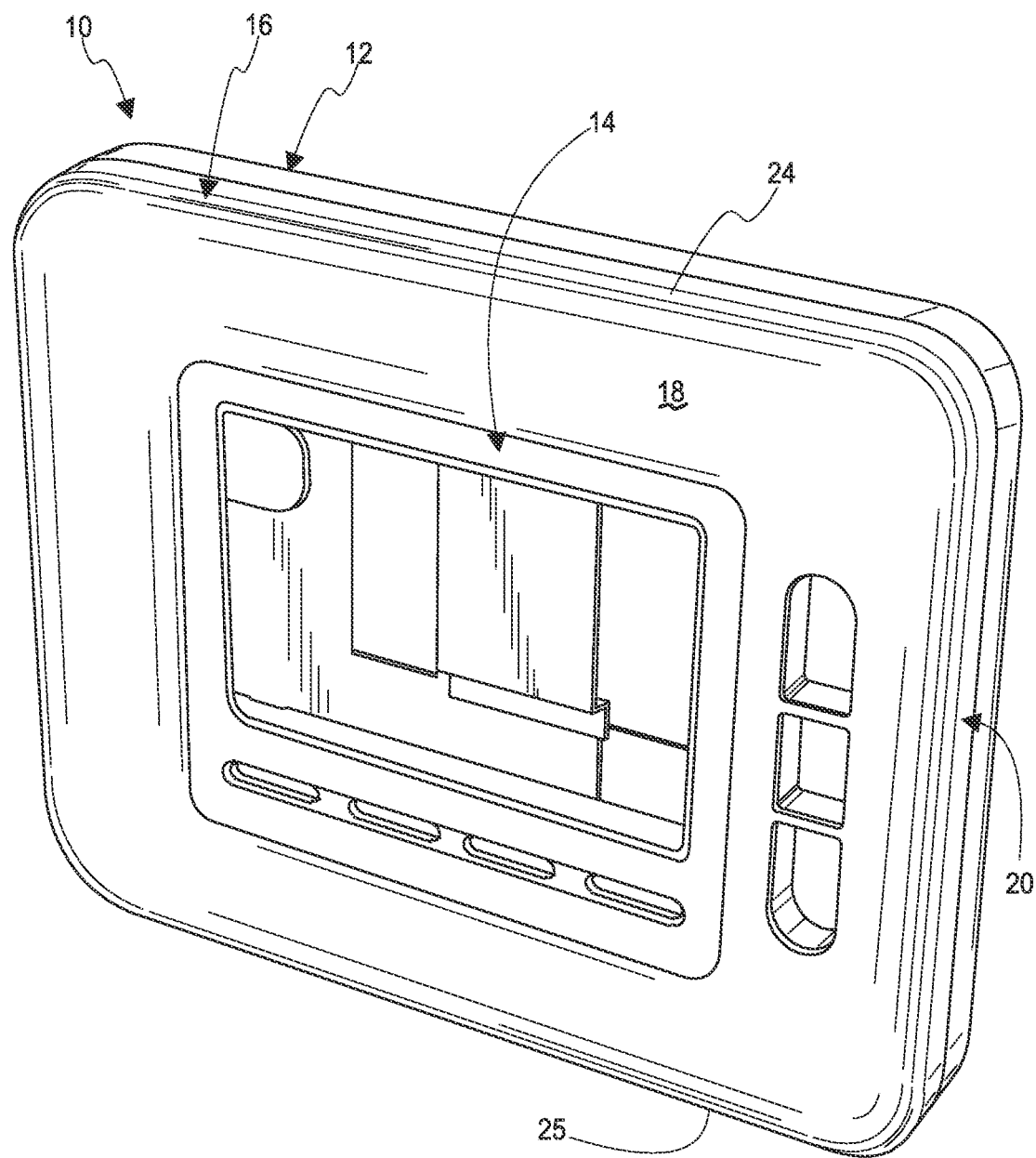
FIG. 1 is a front-top-left perspective view of a control housing assembly according to an embodiment.
Figure 7:
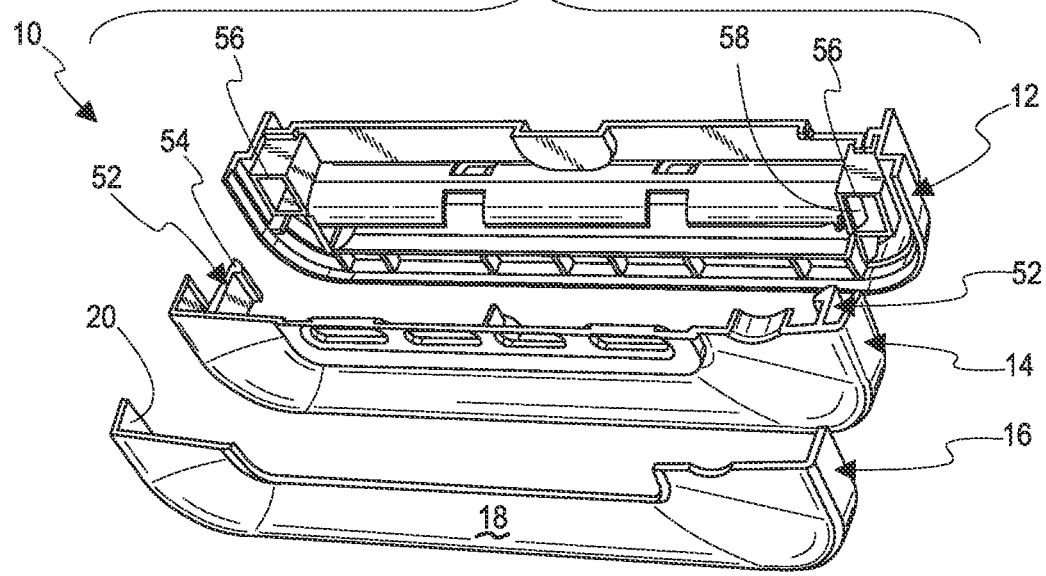
FIG. 7 is a fully exploded front-top-left perspective view of a longitudinal horizontal cross section of the housing assembly of FIG. 1.
Figure 8:
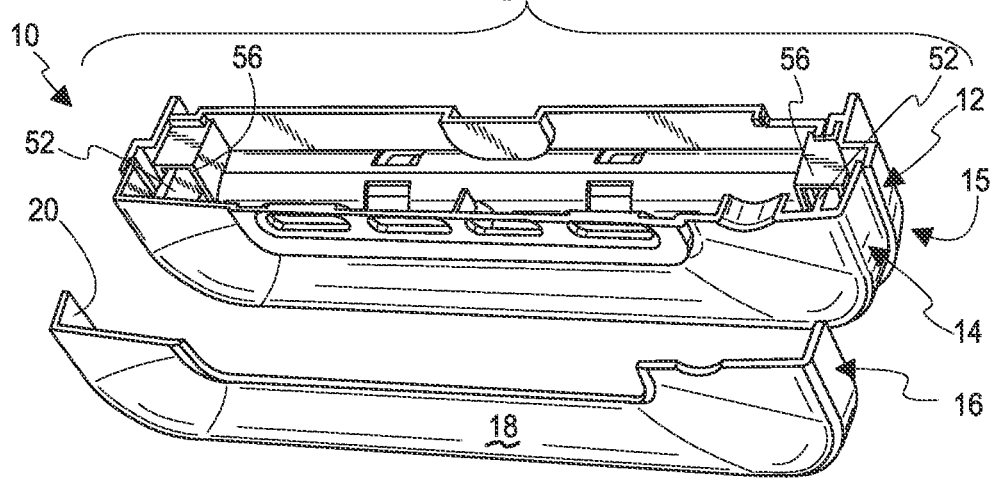
FIG. 8 is a partially exploded view of the cross-sectioned housing assembly as shown in FIG. 7.
Figure 9:
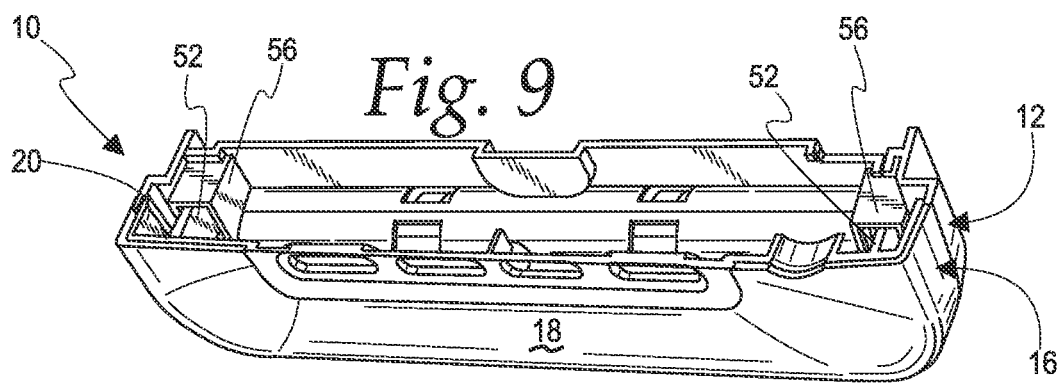
FIG. 9 is a fully assembled view of the cross-sectioned housing assembly as shown in FIG. 7.

More particularly, a control housing assembly 10 according to an embodiment is now described with reference to the accompanying drawings of FIGS. 1-9. The control housing assembly 10, shown fully assembled in FIGS. 1 and 2, is a three-piece assembly, including a rear housing member 12 and a front housing member 14, the rear and front housing members 12 and 14 connecting to form a housing 15 (FIG. 8), and an escutcheon 16. The escutcheon 16 is adapted and configured to be connected manually to the housing 15, and more particularly to the front housing member 14, in a manner illustrated in FIGS. 3-6. Illustrated in the sectional views of FIGS. 7-9 are a manner of manually connecting the front housing member 14 to the rear housing member 12, to produce the configuration of FIG. 8 from that of FIG. 7, and a manner in which the illustrated section of the escutcheon 16 fits over the front housing member 14 when the escutcheon 16 is connected to the front housing member 14, to produce the configuration of FIG. 9 from that of FIG. 8.

Figure 10:
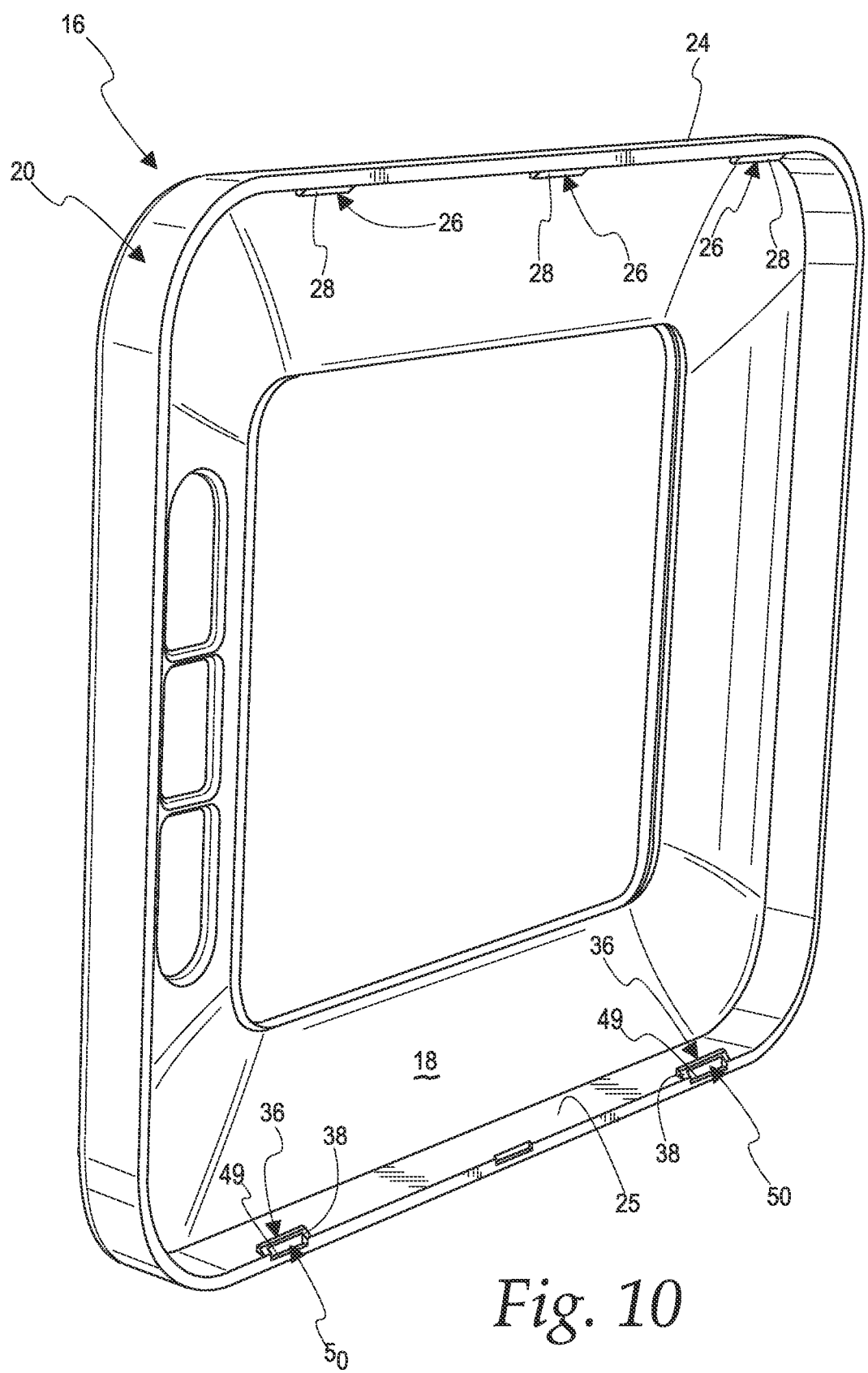
FIG. 10 is a rear-top-left perspective view of an escutcheon of the housing assembly of FIG. 1.

As shown separately in FIG. 10, the escutcheon 16 is a one-piece member comprising a front panel 18 and a peripheral skirt 20 connected to the front panel 18, the peripheral skirt 20 extending around a perimeter of the front panel 18 and extending rearwardly therefrom. Mating features for attaching an upper wall 24 of the escutcheon skirt 20 to the front housing member 14 are illustrated in FIG. 3, and mating features for attaching a lower wall 25 of the escutcheon skirt 20 to the front housing member 14 are illustrated in FIGS. 4-6.

Turning to FIG. 3, protruding inwardly from the upper wall 24 of the escutcheon skirt 20 is at least one, and more particularly, three, upper latches 26, as also seen in FIG. 10, separately depicting the escutcheon 16. The upper latches 26 each include a rear surface 28 that is adapted and configured to cam the latch 26 outwardly when pressed in a rearward direction against a front upper corner region 30 (FIG. 3) of the front housing member 14. More particularly, at least a portion of the rear surface 28 that is adapted and configured to engage the front housing member 14 is inclined so as to face inwardly toward the front upper corner region 30 when initial contact is made. Alternatively, or additionally, the front upper corner region 30 of the front housing member 14 is inclined so as to face outwardly toward the upper latch 26 when initial contact is made. (This is analogous to a front lower corner region 40 of the front housing member 14, which is inclined to face outwardly toward a lower latch 36 of the escutcheon 16 when they initially contact during a rearward connection movement of the escutcheon 16, as introduced and discussed further below with reference to FIG. 6.) Once thus cammed outwardly, the latch 26 is biased to snap back inwardly into a corresponding upper catch channel 32 (FIG. 3) formed in the front housing member 14 once it passes a front end 34 of the upper catch channel 32. It will be understood that each upper latch 26 also includes a front surface (not shown) that is adapted and configured to lockingly abut the front end 34 of the catch channel 32, again, analogously to a front surface 46 of the lower latch 36 lockingly abutting a front end 44 of a lower catch channel 42, as illustrated in FIG. 6.

Figure 6:
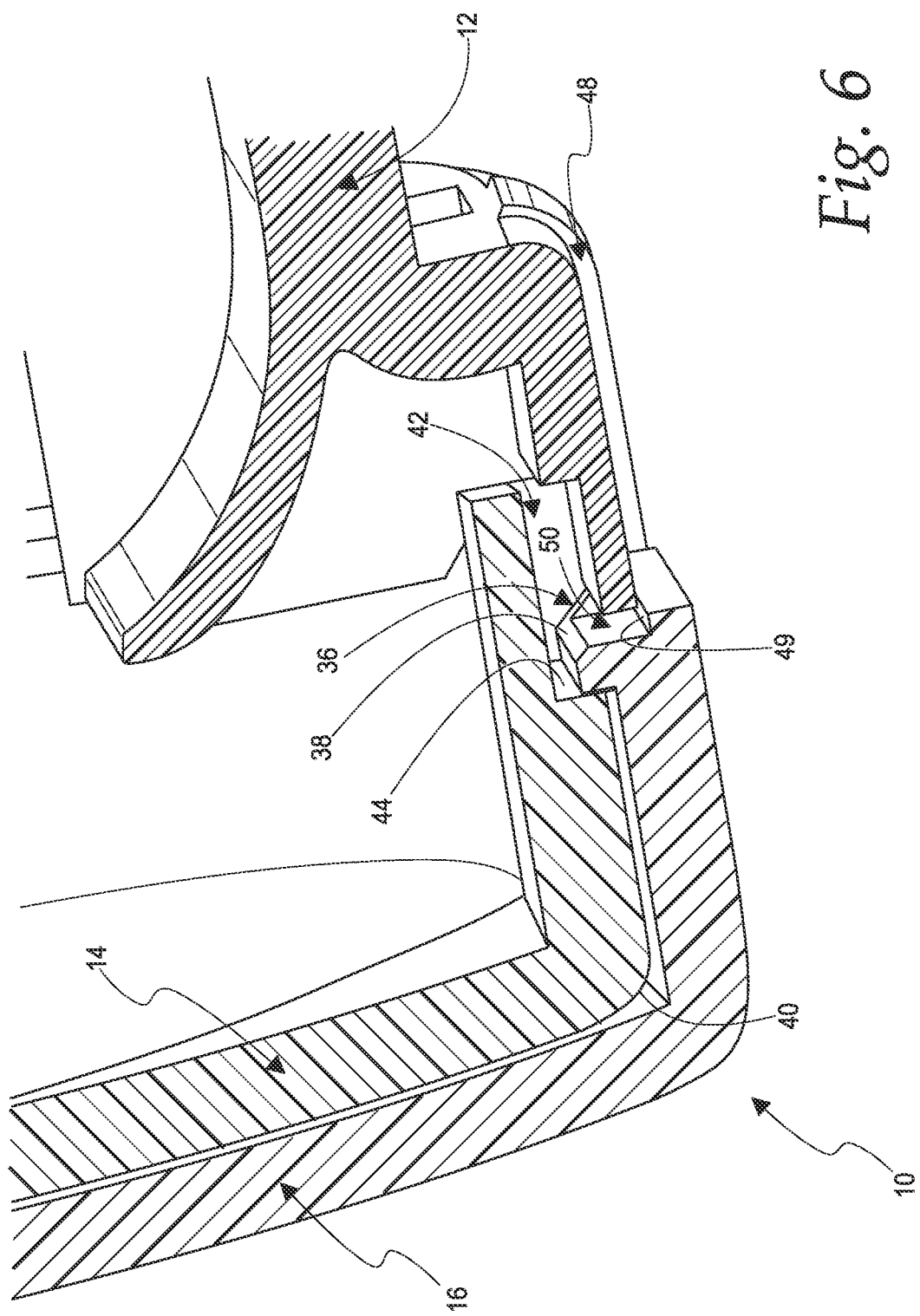
FIG. 6 is a rear-top-left perspective view of a longitudinal vertical cross section of the housing assembly of FIG. 1.

Turning to FIGS. 4-6, protruding inwardly from the lower wall 25 of the escutcheon skirt 20 is at least one, and more particularly, two, lower latches 36, as also seen in FIG. 10, in which the escutcheon 16 is depicted separately from the thermostat housing assembly 10. The lower latches 36 each include a rear surface 38 that is adapted and configured to cam the latch 36 outwardly when pressed in a rearward direction against a front lower corner region 40 (FIG. 6) of the front housing member 14. More particularly, a portion of the rear surface 38 that is adapted and configured to engage the front housing member 14 is inclined so as to face inwardly toward the front lower corner region 40 when initial contact is made. Alternatively, or additionally, the front lower corner region 40 of the front housing member 14 is inclined so as to face outwardly toward the lower latch 36 when initial contact is made, as in the illustrated embodiment as shown in FIG. 6. Once thus cammed outwardly, the latch 36 is biased to snap back inwardly into a corresponding lower catch channel 42 (FIG. 3) formed in the front housing member 14 once it passes a front end 44 of the lower catch channel 42. It will be understood that each lower latch 36 also includes a front surface 46 that is adapted and configured to lockingly abut the front end 44 of the catch channel 42 as illustrated in FIG. 6.

From the foregoing, it will be understood that the escutcheon 16 can easily be manually snapped into place over the front housing member 14, by pushing the escutcheon 16 rearwardly against the front housing member 14, with the upper and lower latches 26, 36 of the escutcheon 16 aligned with the corresponding upper and lower catch channels 32, 42 of the front housing member 14. In addition, a space behind the upper latches 26 in the upper catch channels 32 is covered by the rear housing member 12, so as to obstruct access to the upper latches 26, while a space behind the lower latches 36 in the lower catch channels 42 is mostly covered by the rear housing member 12, so as to obstruct access to the lower latches 36 other than by a thin tool. Thus, manual (toolless) removal of the escutcheon 16 from the front housing member 14 is difficult or practically impossible, due to the locking connections of the upper and lower latches 26, 36 to the corresponding upper and lower catch channels 32, 42.

However, the escutcheon 16 can be removed from the front housing member 14 using a suitable tool as follows. Each of the lower latches 36 includes a tool engaging surface, such as an inward-facing surface, or more particularly an inward-facing surface 49 of a recess 50. The rear housing member 12 includes tool access slots 48 disposed behind the lower latches 36, the front and rear housing members 12 and 14 being adapted and configured so that, when the thermostat housing assembly 10 is fully assembled, neither the rear housing member 12 nor the front housing member 14 obstructs tool access in a forward direction from a rear side of a space inward of each tool engaging surface 49. The tool engaging surface of each lower latch 36 is so aligned with one of the tool access slots 48 as to permit a tool inserted forwardly through the tool access slot to access the space inward of the corresponding tool engaging surface 49. Accordingly, each lower connection can be easily disengaged by inserting a suitable thin tool (e.g., a small flat-head screwdriver, pry lever, or hook) through the tool access slot 48, as indicated by the arrow A in FIG. 6, pulling or pivoting the tool so as to apply an outward force to the lower latch 36 (arrow B) so as to clear the lower latch 36 outwardly of the corresponding lower catch channel 42, pivoting the lower wall 25 of the escutcheon 16 in a forward direction so as to pivot the upper latches 26 outwardly clear of the corresponding upper catch channels 32 and/or to pivot the lower wall 25 forwardly clear of the front housing member 14 (arrow C), and then pulling the escutcheon 16 forwardly and/or upwardly away from the front housing member 14 (arrow D).

In other embodiments not shown, the arrangement of latches and catch channels can be reversed with respect to that of the illustrated embodiment, so that a housing member comprises latches that lock into catch channels of an escutcheon. Thus, opposite peripheral sides of the housing member (e.g., top and bottom or left and right sides) may comprise latches, the latches being adapted and configured to be deflected inwardly as the escutcheon and housing member are brought together, and then to snap outwardly into inward-facing catches formed in the escutcheon. In such embodiments, the latch or latches on at least one of the opposite peripheral sides of the housing member may have an outward-facing tool engaging surface analogous to the inward-facing tool engaging surfaces 49 of the illustrated embodiment, and the escutcheon may have front-facing tool access channels analogous to the rear-facing tool access channels 48 of the rear housing member 12 of the illustrated embodiment, allowing a tool to be inserted rearwardly through a tool access channel so as to engage and apply an inward force to the outward-facing tool engaging surface of the respective latch, to disengage the respective connection and allow the corresponding side of the escutcheon to be pivoted forwardly for removal thereof.

A front housing member and rear housing member of a control housing according to the disclosure may be connected in any suitable manner, but one such manner is illustrated in the cross-sectional views of FIGS. 7 and 8. In particular, the front housing member 14 includes flex tabs 52 with latch ends 54 (FIG. 7), the latch end 54 inserting into a corresponding guide slot 56 of the rear housing member 12 so as to engage a catch 58 (FIG. 7), as shown in FIG. 8. Illustrated in FIG. 9 is a perspective view of the fully assembled rear housing member 12, front housing member 14, and escutcheon 16, cut along the same cross-sectional plane as in the exploded view of FIG. 7 and partially exploded view of FIG. 8.

These and other advantages of the invention will be further understood and appreciated by those skilled in the art by reference to the following written specification, claims and appended drawings. Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The foregoing description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A control panel housing assembly comprising:
   a housing comprising at least one housing member, the at least one housing member comprising a first wall and a second wall generally opposite the first wall, the first wall comprising a first catch channel and the second wall comprising a second catch channel;
   an escutcheon, the escutcheon adapted to be connected to the at least one housing member, the escutcheon comprising a front panel and a peripheral skirt connected to the front panel, the peripheral skirt extending rearwardly from the front panel, the peripheral skirt comprising a first wall and a second wall generally opposite the first wall, the first wall comprising a first latch and the second wall comprising a second latch, the first latch being adapted and configured to engage the first catch channel when the escutcheon is aligned with and manually moved rearwardly into connection with the at least one housing member, so as to obstruct forward movement of the first escutcheon wall away from the at least one housing member when the escutcheon is connected to the front housing member, the second latch being adapted and configured to engage the second catch channel when the escutcheon is aligned with and manually moved rearwardly into connection with the at least one housing member, so as to obstruct forward movement of the second escutcheon wall away from the at least one housing member when the escutcheon is connected to the at least one housing member;

the housing being adapted and configured so that, when the escutcheon is connected to the at least one housing member, the housing covers the first latch so as to obstruct manual access to first latch and covers the second latch so as to obstruct manual access to the second latch, the housing further comprising a tool access slot adapted and configured to permit a tool to be inserted through the tool access slot and to move the second latch to a disengaged position relative to the second catch channel so as to permit forward movement of the second escutcheon wall away from the at least one housing member.

2. The control panel housing assembly of claim 1, the at least one housing member comprising a rear housing member and a front housing member, the rear housing member being adapted to be connected to the front housing member, the front housing member comprising the first wall, first catch channel, second wall, and second catch channel of the at least one housing member.

3. The control panel housing assembly of claim 1, the second latch comprising a tool engaging surface facing inwardly toward an area behind the escutcheon front panel, the second latch, when engaged with the second catch channel, being adapted and configured to be moved to the disengaged position relative to the second catch channel by the tool applying an outward force to the tool engaging surface.

4. The control panel housing assembly of claim 3, the second latch further comprising a tool receiving recess formed on an inward-facing side of the second latch, the tool engaging surface comprising an inward-facing surface of the tool receiving recess.

5. The control panel housing assembly of claim 1, the second latch comprising a rear surface, the second latch rear surface being adapted and configured to engage the at least one housing member so as to cam the second latch outwardly away from an area behind the escutcheon front panel when the escutcheon is aligned with and manually moved rearwardly into connection with the at least one housing member, and the second latch being adapted and configured to snap into engagement with the second catch channel when the front end of the second latch passes behind a front end of the second catch channel.

6. The control panel housing assembly of claim 5, at least a portion of the second latch rear surface being inclined so as to face inwardly toward an initial point of contact with the at least one housing member when the escutcheon is aligned with and manually moved rearwardly into connection with the at least one housing member.

7. The control panel housing assembly of claim 5, at least a portion of the at least one housing member being inclined to face outwardly toward an initial point of contact with the second latch rear surface when the escutcheon is aligned with and manually moved rearwardly into connection with the at least one housing member.

\* \* \* \* \*